United States Patent
Winkler et al.

(10) Patent No.: US 7,038,344 B2
(45) Date of Patent: May 2, 2006

(54) HOUSING COMPRISING AT LEAST ONE FUNCTIONAL ELEMENT OF AN ELECTRICAL MACHINE

(75) Inventors: Wolfgang Winkler, Schutterwald (DE); Hartmut Nitzsche, Buehl (DE); Heinz Seibert, Achern (DE); Klaus Vollmer, Buehl (DE); Martin Huber, Oberkirch (DE); Cornelia Lula, Dettenhausen (DE); Michael Kupferer, Rheinau Freistett (DE); Robert White, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 59 days.

(21) Appl. No.: 10/474,486

(22) PCT Filed: Jan. 29, 2002

(86) PCT No.: PCT/DE02/00282

§ 371 (c)(1),
(2), (4) Date: Apr. 5, 2004

(87) PCT Pub. No.: WO02/084847

PCT Pub. Date: Oct. 24, 2002

(65) Prior Publication Data

US 2004/0169435 A1    Sep. 2, 2004

(30) Foreign Application Priority Data

Apr. 12, 2001  (DE) ............................... 101 18 275

(51) Int. Cl.
*H02K 11/00* (2006.01)

(52) U.S. Cl. .................. 310/156.16; 310/194; 310/214

(58) Field of Classification Search .................. 310/85, 310/88, 89, 128, 135, 156.12, 156.16, 156.26, 310/231, 233–235, 239, 242, 245, 248–249, 310/194, 214
See application file for complete search history.

(56) References Cited

U.S. PATENT DOCUMENTS

| | | | |
|---|---|---|---|
| 4,746,828 A * | 5/1988 | Nado et al. .................... 310/90 |
| 5,064,342 A * | 11/1991 | Iwai ............................ 415/55.1 |
| 5,661,357 A | 8/1997 | Iijima | |
| 5,872,414 A * | 2/1999 | Iijima ............................ 310/89 |
| 6,163,096 A * | 12/2000 | Michenfelder et al. ..... 310/239 |
| 6,294,857 B1 * | 9/2001 | Nakane ....................... 310/239 |
| 6,700,291 B1 * | 3/2004 | Uchida et al. .............. 310/239 |
| 6,798,109 B1 * | 9/2004 | Ortt et al. ................... 310/239 |
| 6,873,084 B1 * | 3/2005 | Richard ....................... 310/239 |

FOREIGN PATENT DOCUMENTS

| | | |
|---|---|---|
| CH | 582 439 | 11/1976 |
| DE | 43 37 390 | 4/1995 |
| DE | 197 10 015 | 9/1998 |
| DE | 198 33 802 | 2/2000 |
| DE | 199 26 171 | 12/2000 |
| EP | 0 703 655 | 3/1996 |
| EP | 0 739 077 | 10/1996 |
| EP | 0 911 949 | 4/1999 |
| JP | 58 051 757 | 3/1983 |
| WO | 97 43819 | 11/1997 |

* cited by examiner

*Primary Examiner*—Darren Schuberg
*Assistant Examiner*—Heba Elkassabgi
(74) *Attorney, Agent, or Firm*—Kenyon & Kenyon

(57) ABSTRACT

Functional elements are difficult to mount on a housing based on known methods, on which at least one functional element for an electric motor is situated. A housing is configured such that functional elements to be mounted on the housing are mountable on the housing from the outside.

20 Claims, 3 Drawing Sheets

HOUSING COMPRISING AT LEAST ONE FUNCTIONAL ELEMENT OF AN ELECTRICAL MACHINE

FIELD OF THE INVENTION

The present invention is directed to a housing.

BACKGROUND INFORMATION

From German Published Patent Application No. 198 33 802, an electric motor having a housing is known, the housing having elements of the electric motor, such as brushes, brush holders, bearings, bearing supports. Assembly of these elements is very complicated. For example, when installing an armature having a commutator in the housing, the brushes and their holder must be pushed back. It is not possible to install the brushes once the commutator is installed.

From German Published Patent Application No. 199 26 171, an electric drive having a gearbox including a bearing support and a brush holder for an electric motor is known. Assembly of these elements is also very complicated.

U.S. Pat. No. 5,661,357 describes a housing having a bearing support and holder for a bearing of an electric motor, the bearing forming one unit with the housing.

European Published Patent Application No. 911 949 discusses a plug-and-socket device having electrical power supply leads for an electric motor, the leads being mounted on a gearbox housing.

European Published Patent 739 077 No. describes a brush holder having brushes mounted in axial direction on an electric motor gearbox.

PCT Publication No. WO 97/43819 describes an electric drive where a plug having electric leads is mounted on a housing from the outside.

German Published Patent Application No. 43 37 390 describes an electric drive unit, where the brush holder along with the brushes is mounted on the housing from the outside.

SUMMARY OF THE INVENTION

The housing according to the present invention has the advantage that the mounting of the functional elements on the housing is simplified in a straightforward manner.

It is advantageous for the housing to have a bearing support, into which a bearing for a shaft of an armature of an electrical machine may be installed, preferably from the outside, because this simplifies assembly.

It is of further advantage, when the housing has at least one mount for supporting and/or holding the functional elements.

Advantageously, at least one rotational speed-sensing element of an electrical machine, electrical conductor tracks, or at least one electric interference suppression coil are mountable on the housing from the outside as functional elements.

It is advantageous if the bearing support and holder are designed as one piece with the housing, since this eliminates the need for additional fastening elements for attaching the bearing.

This configuration of the housing advantageously integrates a brush holder and/or end shield into the housing. This saves on the cost and time of mounting a brush holder or an end shield on the housing.

The housing may advantageously form a magnetic return path element for an electric motor.

If the housing is electrically or magnetically conductive, it is advantageous to electrically insulate the mount from the housing.

To electrically interconnect the functional elements, it is advantageous to inject electrical conductor tracks into the housing.

The housing may advantageously form part of an electric drive, such as being one unit with a gearbox, for example, reducing the number of parts to be installed.

The housing may advantageously have bushings for the brushes, eliminating the need for mounting additional brush boxes.

Together with the brush box, the mount for interference suppression coils, etc., the housing integrates and combines the functions of a brush holder in an advantageous manner.

The housing may be closed at one end and contain a bearing support, integrating and combining the functions of an end shield in an advantageous manner.

The housing offers advantages during assembly, because the brush and/or interference suppression coil, etc. do not have to be mounted until after the armature and its shaft are placed in the housing.

DETAILED DESCRIPTION

Figure 1:
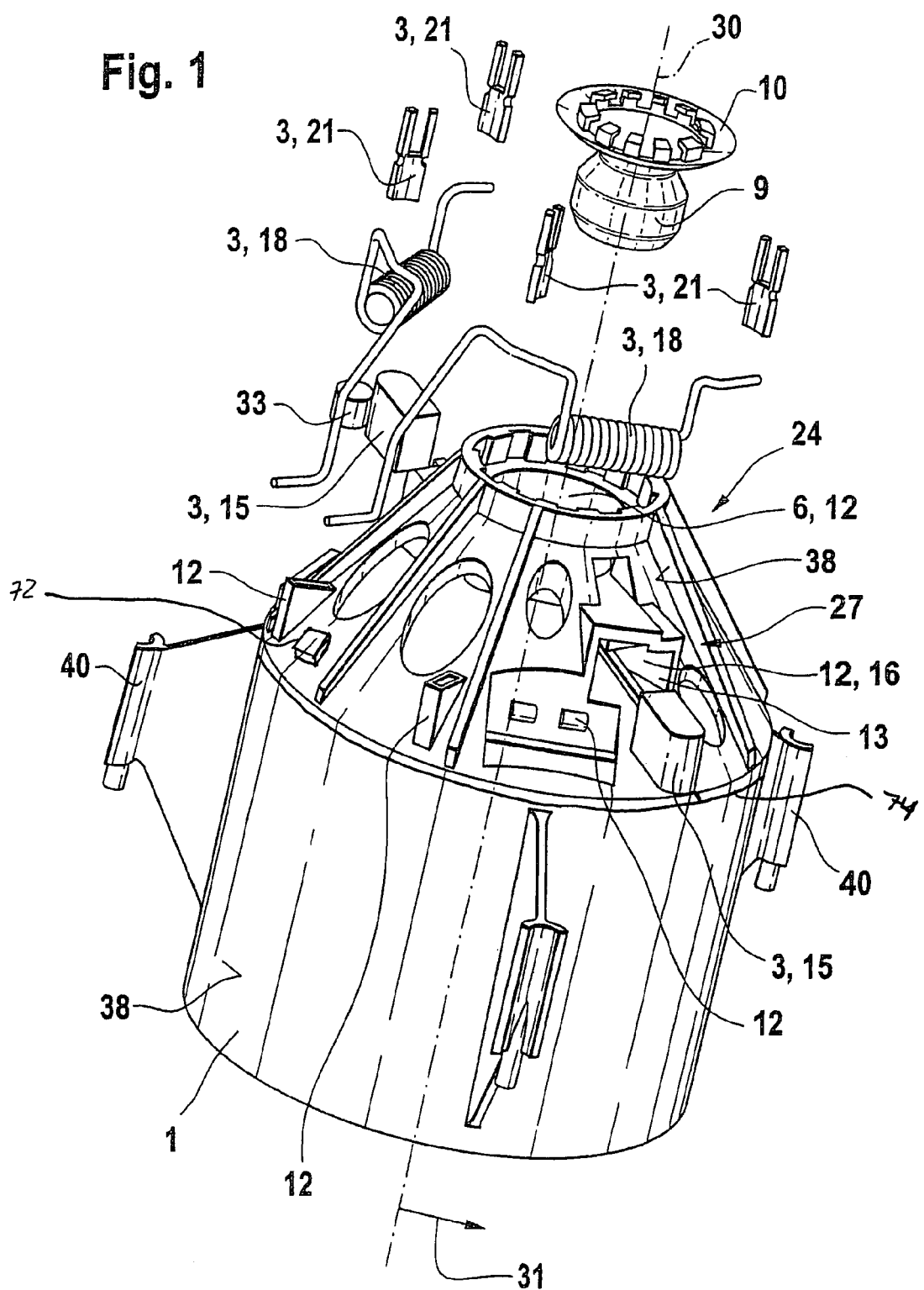
FIG. 1 shows a housing according to the present invention together with the functional elements in exploded view.

FIG. 1 shows a housing 1, embodied according to the present invention, in exploded view. Housing 1 may be a housing of an electrical machine such as an electric motor or an electric generator.

Housing 1 has a hollow cylindrical shape, for example, and converges at one axial end, for example, conically toward the inside in a radial direction 31, for example. In addition, housing 1 has brackets 40 by which it is suspended in another housing.

At least one functional element 3 for an electric motor is attachable from the outside to housing 1. From the outside means that functional elements 3 are mountable after housing 1 and an armature of the electrical machine inserted into housing 1 have already been assembled. In particular, functional elements 3 are mountable to an outer lateral surface 38 of housing 1.

Housing 1, for example, has at least one mount 12, configured, for example, as a pocket, for a functional element 3, in which mount the latter is supported and/or guided and/or fastened. At one axial end of housing 1 there is a bearing support 6, into which a bearing 9 can be mounted from the outside, but also from the inside. Bearing 9 may be fastened to housing 1 using a bearing attachment 10, in the form of a clamping ring, for example. Bearing support 6 and holder or attachment 10 may also form one piece with the housing as shown in European Published Patent Application No. 703 655.

An axial direction 30, such as a rotational axis of an armature 76 (shown schematically in FIG. 2) of the electrical machine situated in housing 1, forms a center axis for housing 1. Perpendicular to the axial direction 30, for example, housing 1 has, as a mount 12, at least one brush box 16, into which one brush 15, as a functional element 3, may be inserted from the outside in at least partially radial direction 31, and is movable obliquely or perpendicularly to axial direction 30. Brush 15 is passed through brush box 16 and rests on a commutator of an electrical machine, the commutator being situated inside of housing 1.

Furthermore, at least one electric interference suppression coil 18, for example, is present as functional element 3. Coils 18 are also held in a mount 12 on the outside. Coil 18 is electrically connected to at least one brush 15 via electrical connections.

For support or electrical interconnection of functional elements 3, a connection element 21 is used that may also be plugged into a mount 12, configured as a clamp retainer, for example, of housing 1. Connection element 21 has a terminal slot, into which an electrical connection of a coil 18 and of a brush lead may be jointly clamped and thus be electrically connected with one another.

A spring 33, which presses brush 15 against commutator 43 (FIG. 3), is also installed on or in housing 1.

A rotational speed measuring element 72, shown schematically in FIG. 1, such as a Hall sensor may also be installed on housing 1 from the outside.

Housing 1, therefore, is capable of integrating the function of an end shield 24 and/or a brush holder 27. Housing 1 may be molded entirely of plastic.

Part of housing 1 may also form a magnetic return path element or a field frame for the electric motor. If housing 1 is made of an electrically conductive material such as a metal, mounts 12 are electrically insulated from housing 1. This may be done, for example, by mounting mounts 12 made of plastic on housing 1, or by molding mounts 12 made of plastic onto housing 1. Housing 1 may also be molded of a mixture of plastic and a magnetically conductive material, so that it serves as a magnetic return path element. Electrically insulated mounts 12 may also be molded onto housing 1 in this case.

For electrical connection of functional elements 3, 15, 18, electrical conductor tracks 74 may be injected into housing 1.

Figure 2:
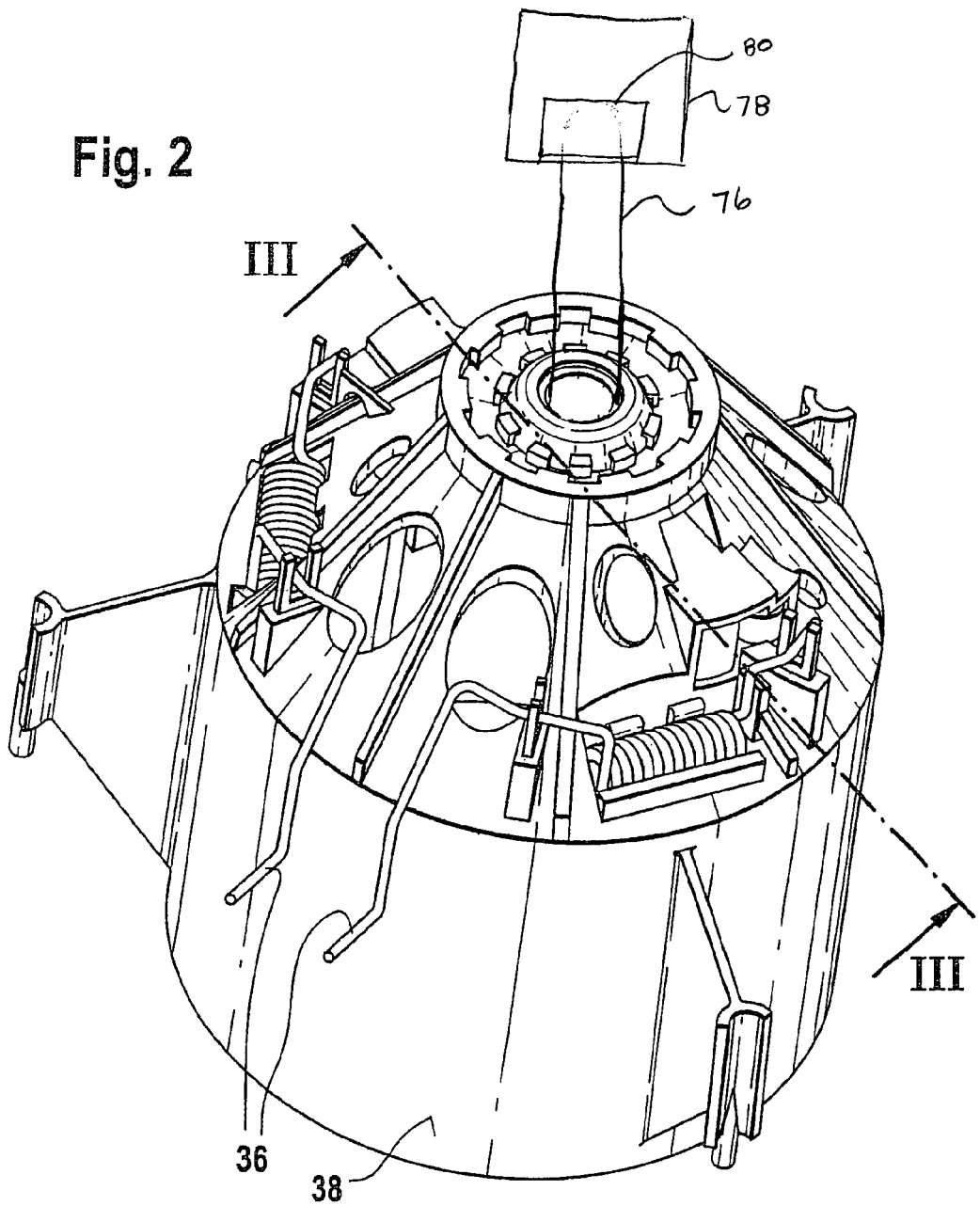
FIG. 2 shows a housing configured according to the present invention together with the functional elements mounted.

FIG. 2 shows a housing 1 according to the present invention with functional elements 3 installed. In FIG. 2, two outer electrical connections 36 are shown, through which an electric current may pass to an armature winding of the electrical machine via coils 18, brushes 15, and the commutator.

Figure 3:
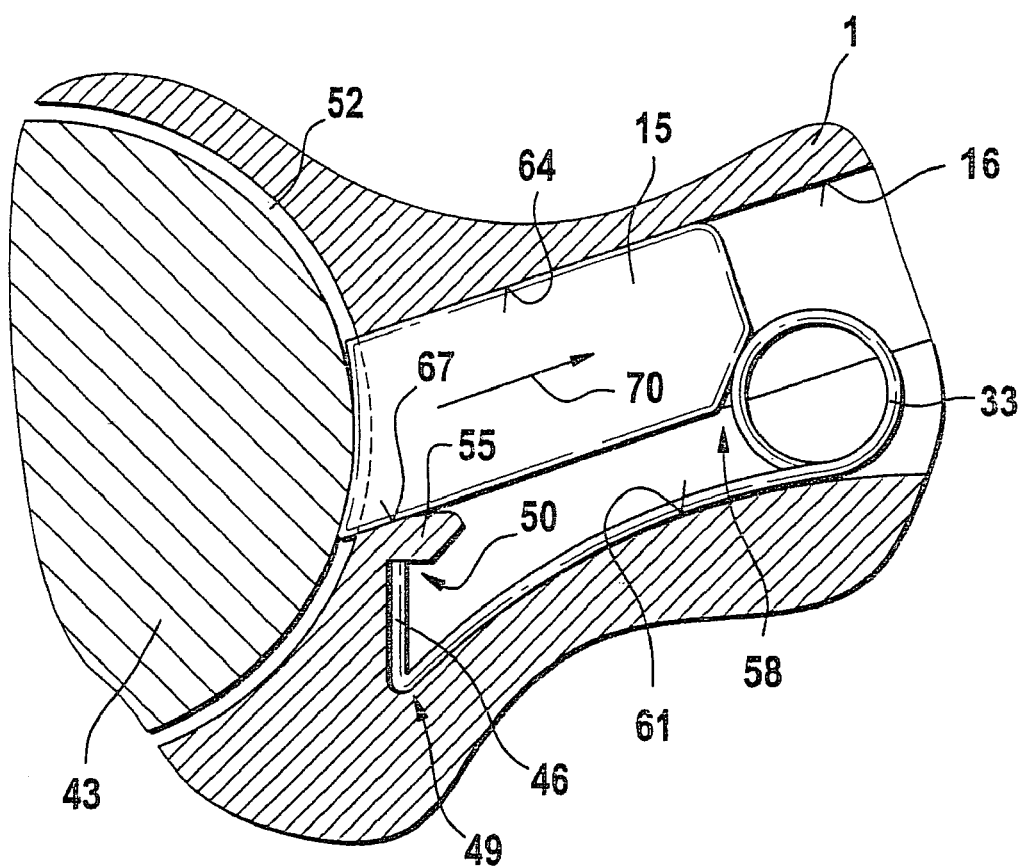
FIG. 3 shows a partial section in which a coil spring presses a brush against a commutator.

FIG. 3 shows spring 33, configured as a coil spring, in housing 1, in a radial cross-section along line III—III of FIG. 2. Spring 33 presses brush 15 against commutator 43 of an electrical machine.

Coil spring 33 is rolled up in a circle when unstressed. At one end 46, coil spring 33 has a V-shape 49, for example.

Commutator 43 rotates in an internal opening 52 of housing 1. Housing 1 has, near opening 52, a projection 55 extending from opening 52 in a roughly radial direction 70 along brush box 16. This projection 55 forms an undercut 50 with a facing wall 61 of brush box 16, in which the V-shape of spring 33 is wedged. When spring 33 is fastened in this manner, it continues to be rolled up until brush 15 is capable of being pushed into brush box 16. Brush 15, at an end facing away from commutator 43, has a bevel 58, to which the circular part of the still-rolled-up loaded coil spring 33 is applied. Brush 15 is pressed against a second wall 64 of brush box 16 and against commutator 43 by spring 33. Wall 61 of brush box 16, situated opposite second wall 64, has a curved shape that is, to some extent, adapted to the shape of spring 33 between V-shape 49 and the rolled-up part.

Brush 15 is guided by second wall 64 and a section 67 at projection 55. Spring 33, configured as a coil spring, is able to generate—in contrast to a helical spring—an almost constant force despite wear on the brush length. The length of brush box 16 in radial direction 70 is also better utilizable, since spring 33, configured as a coil spring, uses less axial space in the housing than a helical spring.

The housing 1 may be part of an electrical drive unit 78, which may include a gear unit 80, both of which are shown schematically in FIG. 2.

What is claimed is:

1. A housing for an electrical machine, comprising:
a structure capable of supporting at least one functional element through which an electric current flows, the at least one functional element being attachable to the structure from the outside; and
a coil spring; wherein:
the at least one functional element includes a brush mounted in a brush box for a commutator of the electrical machine;
the coil spring is rigidly clamped at one end in an undercut of the brush box; and
a circular part of the coil spring presses the brush against the commutator and a wall of the brush box.

2. The housing as recited in claim 1 wherein:
the structure includes at least one mount for the at least one functional element.

3. The housing as recited in claim 1 further comprising:
at least one bearing support for at least one bearing.

4. The housing as recited in claim 3 wherein:
the at least one bearing is mountable onto the at least one bearing support from the outside.

5. The housing as recited in claim 1 wherein:
the at least one functional element includes an electrical interference suppression coil.

6. The housing as recited in claim 2 wherein:
the at least one mount includes at least one brush box.

7. The housing as recited in claim 1 wherein:
the housing is part of an electrical drive unit.

8. The housing as recited in claim 3 wherein:
the at least one bearing support forms one piece with the structure.

9. The housing as recited in claim 3 further comprising:
a holder, wherein:
the at least one bearing support and the holder form one piece with the structure.

10. The housing as recited in claim 1 further comprising:
a brush holder integrated in the structure.

11. The housing as recited in claim 1 further comprising:
an end shield integrated in the structure.

12. The housing as recited in claim 1 wherein:
the structure forms one of a magnetic return path element and a field frame for an electric motor.

13. The housing as recited in claim 2 wherein:
the at least one mount is electrically insulated from the structure.

14. The housing as recited in claim 1 further comprising:
electrical conductor tracks one of being placed in and injected into the structure as functional elements.

15. The housing as recited in claim 1 wherein:
the at least one functional element is mountable when the structure and an armature of the electrical machine are assembled.

16. The housing as recited in claim 1 wherein:
the at least one functional element is mountable on a lateral surface of the structure.

17. The housing as recited in claim 11 wherein:

the at least one functional element is mountable on the end shield.

18. The housing as recited in claim 7 wherein:

the at least one functional element is mountable on a side of the structure facing away from a gear unit of the electrical drive unit.

19. The housing as recited in claim 1 wherein:

the at least one functional element is mountable at least partially in a radial direction.

20. The housing as recited in claim 1 wherein:

at least one rotational speed-sensing element for the electrical machine is externally mountable on the structure.

* * * * *